United States Patent [19]

Wong

[11] 3,961,606
[45] June 8, 1976

[54] THERMALLY RESPONSIVE FLUID CONTROL VALVE

[75] Inventor: Backman Wong, Wayland, Mass.

[73] Assignee: Standard-Thomson Corporation, Waltham, Mass.

[22] Filed: Jan. 2, 1975

[21] Appl. No.: 538,186

[52] U.S. Cl. .............................. 123/41.12; 137/107; 192/91 R; 192/82 T; 236/101 A; 251/11
[51] Int. Cl.² .......................................... F16D 43/25
[58] Field of Search ............. 192/82 T, 91 R, 91 A; 123/41.12; 251/11; 137/107, 102; 236/101 A

[56] References Cited
UNITED STATES PATENTS

| | | | |
|---|---|---|---|
| 2,637,308 | 5/1953 | Dodge | 192/82 T |
| 3,339,574 | 9/1967 | Erb et al. | 137/102 |
| 3,756,083 | 9/1973 | Tatsutomi et al. | 251/11 X |
| 3,777,866 | 12/1973 | Elmer | 192/82 T X |

Primary Examiner—Allan D. Herrmann
Attorney, Agent, or Firm—Jacox & Meckstroth

[57] ABSTRACT

A thermally responsive fluid control valve device which is particularly adapted for control of an air operable clutch. The valve device includes a housing which is adapted to be positioned adjacent a conduit which is a part of a system through which coolant fluid flows in a cooling system of an internal combustion engine. The valve device includes a thermally responsive actuator member which is adapted to be positioned within a conduit within which coolant fluid flows. The thermally responsive actuator member has a portion operable upon a movable valve element which is within the housing and which controls flow of air through the housing. The movable valve element is also operable by air at suitable pressures within the housing.

6 Claims, 5 Drawing Figures

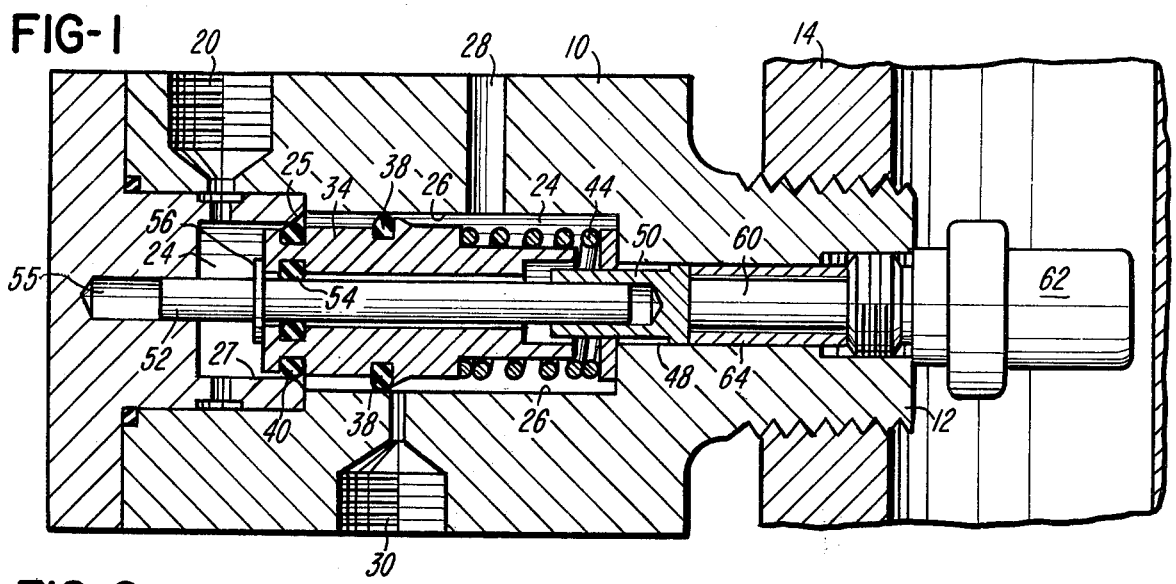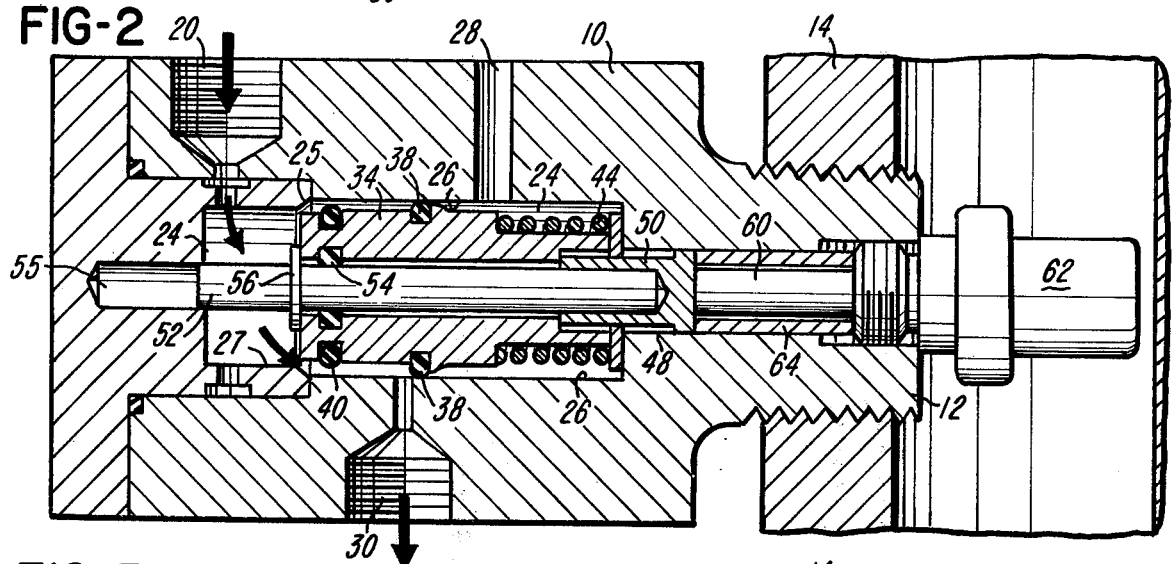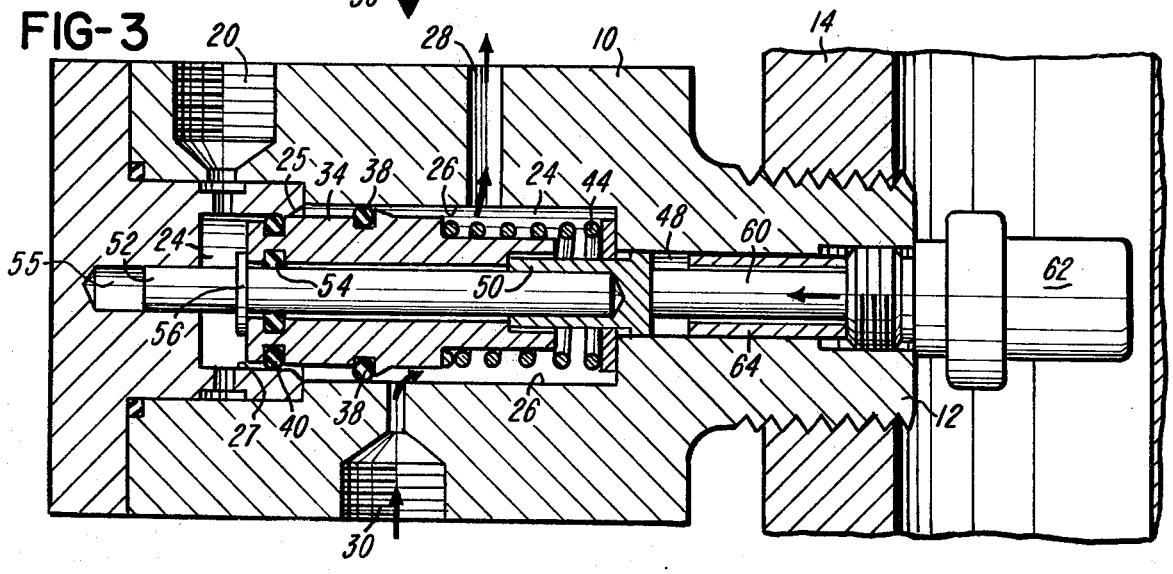

THERMALLY RESPONSIVE FLUID CONTROL VALVE

BACKGROUND OF THE INVENTION

It is desirable in an internal combustion engine cooling system to operate a radiator cooling fan only when the coolant fluid in the cooling system is above a predeterined temperature. In such cooling systems fans are employed which are responsive to air pressure for clutching and de-clutching the fan. The thermally responsive valve device of this invention is particularly adapted for control of flow of air which operates such an air operable clutch of a fan.

Thermally responsive valve devices are known which control air flow and air pressure for operation of an air operable clutch of a fan. However, such known devices are rather complex and relatively costly to produce.

It is an object of this invention to provide a thermally responsive fluid control valve device which is particularly adapted to control air pressure to an air operable clutch, which valve device can be constructed at relatively low costs and which is long-lived.

Other objects and advantages of this invention reside in the construction of parts, the combination thereof, the method of manufacture, and the mode of operation, as will become more apparent from the following description.

BRIEF DESCRIPTION OF THE VIEWS OF THE DRAWING

FIG. 1 is a sectional view of a thermally responsive fluid control valve device of this invention.

FIG. 2 is a sectional view, similar to FIG. 1, showing elements of the fluid control valve device in a position of operation.

FIG. 3 is a sectional view, similar to FIGS. 1 and 2, showing elements of the device in another position of operation.

DESCRIPTION OF THE PREFERRED EMBODIMENTS

Figure 4:
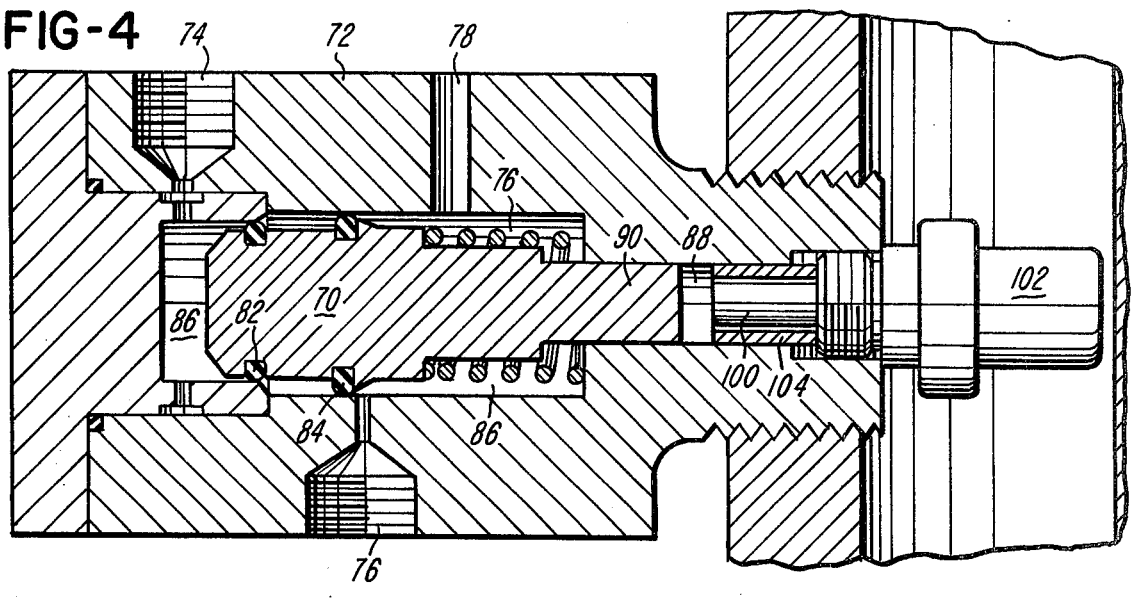
FIG. 4 is a sectional view similar to FIG. 1, showing a modification in the thermally responsive fluid control valve device of this invention.

A thermally responsive fluid control valve device of this invention as illustrated in FIGS. 1, 2 and 3 comprises a housing 10 having a threaded end portion 12, which is adapted to be attached to and extend through a portion of a fluid conduit 14. The fluid conduit 14 is part of a system within which coolant fluid flows for cooling an internal combustion engine or the like.

The housing 10 has an inlet passage 20 which is adapted to be in communication with a source of air under a suitable pressure, such as for example, air under a pressure of from 0.42 to 0.84 kilograms per square centimeter. The inlet passage 20 is in communication with a main passage or cavity 24 within the housing 10. An inclined annular shoulder 25 within the main cavity or passage 24 separates an annular wall 26 of greater dimension from an annular wall 27 of lesser dimension. The shoulder 25, the wall 26, and the wall 27 serve as valve seat surfaces.

Also in communication with the main passage or cavity 24 is a vent passage 28 and an outlet passage 30. The outlet passage 30 is adapted to be in communication with an air operable clutch of a rotatable fan which cools the radiator of the cooling system of which the fluid conduit 14 is a part. The vent passage 28 is in communication with the atmosphere.

Within the main passage or cavity 24 is a movable valve member 34 which has an annular elastomeric sealing member 38 which is in engagement with the wall 26 and an annular elastomeric sealing member 40 which is normally in engagement with the shoulder 25, as illustrated in FIG. 1. Under deactivated conditions, the elastomeric sealing member 38 is positioned between the inlet passage 20 and the outlet passage 30, as shown in FIG. 1.

A spring member 44 within the main cavity or passage 24 engages the movable valve member 34 and urges movement thereof toward the portion of the main cavity 24 which has the wall 27 of lesser dimension.

The main cavity or passage 24 has a relatively small diameter extension portion 48 extending from the part thereof within which the spring member 44 is located. Within the extension portion 48 is slidably positioned a bushing 50 which slidably encompasses a shaft 52 which extends through the movable valve member 34.

The shaft 52 is shown as being axially movable with respect to the movable valve member 34. An annular elastomeric sealing member 54 is shown encompassing the shaft 52. The shaft 52 is also journalled within an opening 55 in an internal portion of the housing 10 adjacent the cavity 24 and is slidably axially movable therewithin. A collar 56 encompasses the shaft 52 and is attached thereto.

The bushing 50 is normally in engagement with an actuator rod 60 of a thermally responsive actuator device 62. The thermally responsive actuator device 62 is positioned within the fluid conduit 14, and is attached to the threaded end portion 12 of the housing 10. Encompassing the actuator rod 60 is a bearing sleeve 64. The thermally responsive actuator device 62 may be any suitable thermally responsive actuator device, for example, an actuator device such as that shown in U.S. Pat. Nos. 2,806,375 and 2,806,376, in which an actuator rod is moved outwardly when the actuator device is subjected to temperatures above a predetermined value.

OPERATION

As stated above, the inlet passage 20 of the housing 10 is in communication with a source of air under suitable pressure. The outlet passage 30 is in communication with an air operable clutch, not shown. When air pressure of a predetermined value is applied to the clutch, the clutch is deenergized so that a fan, not shown, joined thereto does not operate. When in operation, the fan cools the radiator in the cooling system of which the fluid conduit 14 is a part.

As stated above, the sealing member 40 is normally in engagement with the annular shoulder 25, which serves as a valve seat. Thus, communication between the inlet passage 20 and the outlet passage 30 is normally closed. When the air entering the housing 10 through the inlet passage 20 is of sufficient pressure, the air forces the movable valve member 34 to the right as illustrated in FIG. 2. When this occurs, the movable valve member 34 is moved so that the elastomeric sealing member 38 is positioned between the outlet passage 30 and the vent passage 28, as shown in FIG. 2. The elastomeric sealing member 38, carried by the movable valve member 34 is always in engagement with the annular wall 26, which serves as an annular valve seat surface. Such movement of the movable valve member 34 is against the forces exerted by the spring 44. In this position of the movable valve member 34 the air which enters the inlet passage 20 flows through a portion of the main cavity or passage 24 and outwardly from the housing 10 through the outlet passage 30, as illustrated by arrows in FIG. 2.

Thus, air flows to the air operated clutch and deenergizes the clutch so the fan joined thereto does not operate. Thus, the fan does not cool the radiator of the cooling system of which the fluid conduit 14 is a part. Operation of the engine causes heating of the coolant fluid in the cooling system. Thus, the coolant fluid flowing in the fluid conduit 14 is heated. At least a portion of the coolant fluid, during flow thereof in the conduit 14 engages the actuator device 62. If the temperature of the fluid which engages the actuator device 62 reaches a predetermined value, the actuator rod 60 moves toward the movable valve member 34. After a predetermined length of movement of the actuator rod 60, the actuator rod 60 moves the bushing 50 into engagement with the movable valve member 34 and moves the movable valve member 34 to the left, as shown in FIG. 3. Thus, the elastomeric sealing member 38 is moved to a position between the inlet passage 20 and the outlet passage 30. Thus, air is prevented from flowing from the inlet passage 20 through the outlet passage 30 to the clutch. Therefore, the clutch is deactivated and the fan operates to cool the radiator. When the elastomeric sealing member 38 moves to the position thereof shown in FIG. 3, there is communication between the outlet passage 30 and the vent passage 28. Therefore, the air pressure which had deactivated the clutch is released through the vent passage 28, as illustrated by arrows in FIG. 3.

When the movable valve member 34 is moved to the left by the actuator device 62, the elastomeric sealing member 40 is moved to the position thereof shown in FIG. 3, in engagement with the wall annular 27 of lesser dimension, and is movable therealong. Thus, the annular wall 27 serves as an annular valve seat surface. Thus, the elastomeric sealing member 40 assists in sealing against flow of air from the inlet passage 20 to the outlet passage 30. If the temperature of the fluid which engages the actuator device 62 continues to increase, the actuator rod 60 continues to move the movable valve member 34 to the left, and the elastomeric sealing member 40 moves along the wall surface 27 and the elastomeric sealing member 38 moves along the wall surface 26.

Therefore, the fan which cools the radiator continues to operate and the cooling system is cooled by the fan until the temperature of the fluid engaging the thermally responsive actuator device 62 is reduced sufficiently that the actuator rod 60 can be moved toward the right, permitting the air pressure within the cavity 24 of the housing 10 to force the movable valve member to the right to the position shown in FIG. 2.

If the pressure of the air which enters the inlet passage 20 should decrease below an acceptable value of, for example, 0.42 kilograms per square centimeter, the spring 44 overcomes the pressure of the air and moves the movable valve member 34 to the left so that the elastomeric sealing member 40 engages the shoulder 25 or the wall 27, closing communication between the inlet passage 20 and the outlet passage 30.

FIG. 4

FIG. 4 illustrates another embodiment in the thermally responsive fluid control device of this invention. The difference in the structure shown in FIG. 4, with respect to the structure of FIGS. 1–3, is in the movable valve member, shown in FIG. 4. A movable valve member 70, shown in FIG. 4, preferably, consists of a unitary integral body. The movable valve member 70 is within a housing 72, having an inlet passage 74, an outlet passage 76, and a vent passage 78. The movable valve member 70 is provided with elastomeric sealing members 82 and 84, which are similar to the sealing members 40 and 38, respectively, of the structure shown in FIGS. 1, 2 and 3. A cavity 86 within which the movable valve member 70 is located has an extension portion 88 within which a stem portion 90 of the movable valve member 70 is slidably movable. Also, within the extension portion 88 is an actuator rod 100 of a thermally responsive actuator device 102, similar to the actuator device 62 and the actuator rod 60 of FIGS. 1–3. The actuator rod 100 is encompassed by a guide bearing 104.

The thermally responsive fluid control valve device of FIG. 4 operates and functions in a manner similar to that discussed with respect to the device of FIGS. 1–3.

FIG. 5

Figure 5:
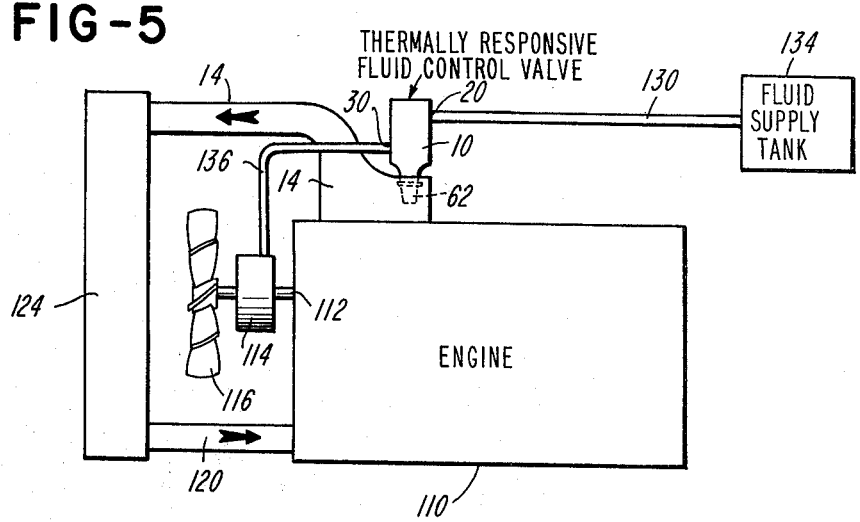
FIG. 5 is a diagrammatic view, illustrating a system of which the invention of this application may be a part.

FIG. 5 is a diagrammatic view of a system within which a thermally responsive fluid control valve of this invention may be a part. An engine 110 has a rotary shaft 112 joined thereto for operation therewith. A fluid operable clutch 114 connects the shaft 112 to a fan 116 for operation thereof. A coolant conduit 14 extends from the engine 110 to a radiator 124, for flow of coolant fluid from the engine 110 to the radiator 124. A coolant return conduit 120 extends from the radiator 124 to the engine 110.

A thermally responsive fluid control device of this invention having the housing 10 is shown diagrammatically in FIG. 5. The inlet passage 20 of the fluid control device is joined to a fluid line 130 which is joined to a fluid supply tank 134, which provides fluid under pressure for operation of the clutch 114. A fluid line 136 is connected between the outlet passage 30 and the clutch 114. The system shown in FIG. 5 is thus similar to a system discussed above, and a thermally responsive fluid control valve of this invention operates in the system in a manner described above.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Valve apparatus for control of a fluid operable clutch in response to temperature conditions within a coolant system of an internal combustion engine in which the clutch joins a fan to a drive member and in which the clutch is actuated for operation of the fan when fluid pressure of a suitable value is absent from the clutch and in which the clutch is disengaged for operation of the fan when fluid pressure of a suitable value is applied to the clutch, comprising:

a housing, the housing having an inlet passage, an outlet passage, and a vent passage, the housing also having a main internal passage which is in communication with the other passages, the main internal passage having wall surfaces forming an annular valve seat between the inlet passage and the outlet passage, a movable valve member within the main internal passage, a first annular elastomeric sealing member carried by the movable valve member in engagement with a wall surface of the main internal passage, a second annular elastomeric sealing member carried by the movable valve member and in engagement with a wall surface of the main internal passage, the movable valve member being movable within the main internal passage to position the first annular elastomeric sealing member in engagement with the annular valve seat to close communication between the inlet passage and the outlet passage, the movable valve member being movable within the main internal passage to position the second annular elastomeric sealing member between the vent passage and the outlet passage, the movable valve member being movable within the main internal passage to position the second annular elastomeric sealing member between the inlet passage and the outlet passage, the second annular elastomeric sealing member being positioned between the inlet passage and the outlet passage when the first annular elastomeric member is in engagement with the annular valve seat, resilient means within the main internal passage and urging movement of the movable valve member toward the annular valve seat for engagement of the first annular elastomeric sealing member within the annular valve seat, a thermally responsive device having a portion operable to move the movable valve member toward the valve seat, the thermally responsive actuator member having a temperature sensing portion exterior of the housing and positionable within a coolant system of an internal combustion engine, the inlet passage of the housing being adapted to be in communication with a source of air having a suitable pressure, the outlet passage of the housing being adapted to be in communication with a clutch of an air operable fan which is operable to cool a radiator of a coolant system of an internal combustion engine.

2. The valve apparatus of claim 1 which includes an engagement member adjacent the movable valve member and engageable therewith and movable with respect thereto, the thermally responsive device having a portion engageable with the engagement member to move the movable valve member.

3. The valve apparatus of claim 2 which includes a shaft extending through the movable valve member and in which the engagement member encompasses an end portion of the shaft and the other end portion of the shaft is journalled in a part of the housing and axially movable with respect thereto.

4. Valve apparatus for control of fluid comprising:

a housing provided with an inlet passage, an outlet passage, and a main passage between the inlet passage and the outlet passage, the main passage being provided with a first annular valve seat surface and a second annular valve seat surface, the housing also having a vent passage in communication with the main passage, a movable valve member within the main passage and having a first annular engagement portion engageable with the first annular valve seat surface to close communication between the inlet passage and the outlet passage, the movable valve member having a second annular engagement portion which is engageable with the second annular valve seat surface to close communication between the vent passage and the outlet passage, thermally responsive actuator mechanism having a sensing portion exterior of the housing and an actuator portion within the housing, the actuator portion being operable to move the movable valve member toward the first annular valve seat surface, resilient means urging the movable valve member toward the first annular valve seat surface.

5. Valve apparatus for control of fluid comprising:

a housing provided with an inlet passage, an outlet passage, and a main passage having a portion between the inlet passage and the outlet passage, the main passage being provided with a plurality of valve seat surfaces, the housing having a vent passage in communication with the main passage, the main passage having a portion between the vent passage and the outlet passage, a movable valve member within the main passage and having a first annular engagement portion engageable with one of the valve seat surfaces of the main passage to close communication between the inlet passage and the outlet passage, the movable valve member having a second annular engagement portion which is engageable with one of the valve seat surfaces of the main passage to close communication between the vent passage and the outlet passage, thermally responsive actuator mechanism having a sensing portion exterior of the housing and an actuator portion within the housing and operable to move the movable valve member to a position in which the first annular engagement portion is in engagement with one of the valve seat surfaces to close communication between the inlet passage and the outlet passage, resilient means urging the movable valve member to a position in which the first annular engagement portion is in engagement with one of the valve seat surfaces to close communication between the inlet passage and the outlet passage.

6. The valve apparatus of claim 5 in which the main passage has a portion of lesser diameter and a portion of greater diameter, each of said portions having annular wall surfaces which serve as annular valve seat surfaces, there being an annular shoulder separating said portions of the main passage and serving as an annular valve seat surface, the first annular engagement portion of the movable valve member being engageable with the annular wall surface of the portion of the main passage which has the lesser diameter and also being engageable with the annular shoulder.

* * * * *

UNITED STATES PATENT OFFICE
CERTIFICATE OF CORRECTION

PATENT NO. : 3,961,606
DATED : June 8, 1976
INVENTOR(S) : Backman Wong

It is certified that error appears in the above-identified patent and that said Letters Patent are hereby corrected as shown below:

Column 3, line 40, "wall annular 27" should read ---annular wall 27---.

Claim 1, Column 5, Line 31, after "elastomeric" insert ---sealing---. Line 36, change "within" to ---with---.

Signed and Sealed this

Seventh Day of September 1976

[SEAL]

Attest:

RUTH C. MASON
*Attesting Officer*

C. MARSHALL DANN
*Commissioner of Patents and Trademarks*